(12) United States Patent
Chae et al.

(10) Patent No.: US 10,098,113 B2
(45) Date of Patent: Oct. 9, 2018

(54) METHOD AND APPARATUS FOR TRANSMITTING DATA BY DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Kijun Kim, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/301,315

(22) PCT Filed: Apr. 8, 2015

(86) PCT No.: PCT/KR2015/003535
§ 371 (c)(1),
(2) Date: Sep. 30, 2016

(87) PCT Pub. No.: WO2015/156605
PCT Pub. Date: Oct. 15, 2015

(65) Prior Publication Data
US 2017/0027014 A1    Jan. 26, 2017

Related U.S. Application Data

(60) Provisional application No. 61/977,073, filed on Apr. 8, 2014.

(51) Int. Cl.
*H04W 4/00*    (2018.01)
*H04W 72/04*    (2009.01)
(Continued)

(52) U.S. Cl.
CPC ...... *H04W 72/0446* (2013.01); *H04B 7/2656* (2013.01); *H04L 1/1614* (2013.01);
(Continued)

(58) Field of Classification Search
None
See application file for complete search history.

(56) References Cited

U.S. PATENT DOCUMENTS

| 2013/0223353 | A1 | 8/2013 | Liu et al. | |
|---|---|---|---|---|
| 2015/0055579 | A1* | 2/2015 | Wu | H04L 1/1867 370/329 |
| 2015/0271846 | A1* | 9/2015 | Kowalski | H04W 72/14 370/329 |

FOREIGN PATENT DOCUMENTS

| CN | 102823168 | 12/2012 |
|---|---|---|
| CN | 103368713 | 10/2013 |

(Continued)

OTHER PUBLICATIONS

PCT International Application No. PCT/KR2015/003534, Written Opinion of the International Searching Authority dated Jun. 29, 2015, 21 pages.
(Continued)

*Primary Examiner* — Jutai Kao
(74) *Attorney, Agent, or Firm* — Lee, Hong, Degerman, Kang & Waimey

(57) ABSTRACT

An embodiment of the present invention provides a method for transmitting device-to-device (D2D) data by a terminal in a wireless communication system, the method for transmitting the D2D data comprising the steps of: determining a sub-frame indicating bitmap corresponding o information indicating a time resource pattern (TRP); determining a bitmap to be applied to a sub-frame pool for transmitting data from the sub-frame indication bitmap; determining a set of sub-frames required to transmit D2D data using the
(Continued)

bitmap to the sub-frame pool for transmitting the data; and transmitting D2D data in a sub-frame included in the set of the sub-frames.

6 Claims, 6 Drawing Sheets

(51) Int. Cl.
*H04W 76/14* (2018.01)
*H04W 4/70* (2018.01)
*H04W 72/14* (2009.01)
*H04B 7/26* (2006.01)
*H04L 1/16* (2006.01)
*H04L 5/00* (2006.01)
*H04W 72/12* (2009.01)

(52) U.S. Cl.
CPC ............. *H04L 5/00* (2013.01); *H04W 4/70* (2018.02); *H04W 72/042* (2013.01); *H04W 72/14* (2013.01); *H04W 76/14* (2018.02); *H04W 72/1263* (2013.01); *H04W 72/1278* (2013.01)

(56) References Cited

FOREIGN PATENT DOCUMENTS

| WO | 2013130362 | 9/2013 |
|---|---|---|
| WO | 2014010858 | 1/2014 |

OTHER PUBLICATIONS

PCT International Application No. PCT/KR2015/003535, Written Opinion of the International Searching Authority dated Jun. 29, 2015, 18 pages.
Intel Corporation, "Discussion on D2D broadcast resource allocation", R1-140130, 3GPP TSG RAN WG1 Meeting #76, Feb. 1, 2014, 7 pages.
Ericsson, "Frame Structure for D2D-Enabled LTE Carriers", R1-140775, 3GPP TSG RAN WG1 Meeting #76, Jan. 31, 2014, 7 pages.
Fujitsu, "Resource Allocation for Discovery Signal", R1-140200, 3GPP TSG-RAN WG1 Meeting #76, Feb. 1, 2014, 3 pages.
Huawei et al., "Resource assignment for D2D communication", R1-135042, 3GPP TSG RAN WG1 Meeting #75, Nov. 1, 2013, 5 pages.
Catt, "Resource allocation mechanism in mode 2", R1-141194, 3GPP TSG RAN WG1 Meeting #76bis, Mar. 22, 2014, 4 pages.
Alcatel-Lucent et al., "Mode 2 transmission UE for D2D communication", R2-141659, 3GPP TSG RAN WG2 Meeting #85bis, Mar. 21, 2014, 3 pages.
Intel Corporation, "Resource allocation signaling for D2D communication", R2-141223, 3GPP TSG RAN WG2 Meeting #85bis, Mar. 22, 2014, 2 pages.
State Intellectual Property Office of the People's Republic of China Application Serial No. 201580027489.4, Office Action dated May 2, 2018, 17 pages.
State Intellectual Property Office of the People's Republic of China Application Serial No. 201580030606.2, Office Action dated May 21, 2018, 12 pages.
Intel, "Discussion on D2D Operation within Network Coverage (Mode-1)", 3GPP TSG RAN WG1 Meeting #76bis, R1-141164, Apr. 2014, 7 pages.

* cited by examiner

METHOD AND APPARATUS FOR TRANSMITTING DATA BY DEVICE-TO-DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2015/003535, filed on Apr. 8, 2015, which claims the benefit of U.S. Provisional Application No. 61/977,073, filed on Apr. 8, 2014, the contents of which are all hereby incorporated by reference herein in their entirety.

TECHNICAL FIELD

The present invention relates to a wireless communication system, and more particularly, to a method and apparatus for transmitting data in Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that with the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to define data transmission according to a time resource pattern.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these and other advantages and in accordance with the purpose of the present invention, as embodied and broadly described, according to one embodiment, a method of transmitting D2D (device to device) data, which is transmitted by a user equipment in a wireless communication system, includes the steps of determining a subframe indication bitmap corresponding to information indicating a TRP (time resource pattern), determining a bitmap to be applied to a subframe pool for data transmission by using the subframe indication bitmap, determining a set of subframes in which D2D data is transmitted using the bitmap for the subframe pool for the data transmission, and transmitting D2D data in a subframe included in the set of the subframes.

To further achieve these and other advantages and in accordance with the purpose of the present invention, according to a different embodiment, a user equipment transmitting a D2D (device to device) signal in a wireless communication system includes a reception module and a processor, the processor configured to determine a subframe indication bitmap corresponding to information indicating a TRP (time resource pattern), the processor configured to determine a bitmap to be applied to a subframe pool for data transmission by using the subframe indication bitmap, the processor configured to determine a set of subframes in which D2D data is transmitted using the bitmap for the subframe pool for the data transmission, the processor configured to transmit the D2D data in a subframe included in the set of the subframes.

If a size M of the subframe indication bitmap is smaller than a size of the subframe pool for the data transmission and the user equipment transmits D2D data in a first subframe of the subframe pool for the data transmission, the user equipment transmits the D2D data in a $(1+M)^{th}$ subframe of the subframe pool for the data transmission.

A first bit value of the bitmap may be identical to a (size of the subframe indication bitmap+1)$^{th}$ bit value.

If a size of the subframe indication bitmap is smaller than a size of the subframe pool for the data transmission, the subframe indication bitmap is repeated in the bitmap.

If the size of the subframe pool for the data transmission is not a multiple of the size of the subframe indication bitmap, a bit of the lastly repeated subframe indication bitmap is sequentially used.

If the size of the subframe pool for the data transmission is not a multiple of the size of the subframe indication bitmap, the lastly repeated subframe indication bitmap corresponds to a truncated bitmap.

Advantageous Effects

According to embodiments of the present invention, it is able to minimize interference/collision between D2D UEs.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Mode for Invention

Figure 1:
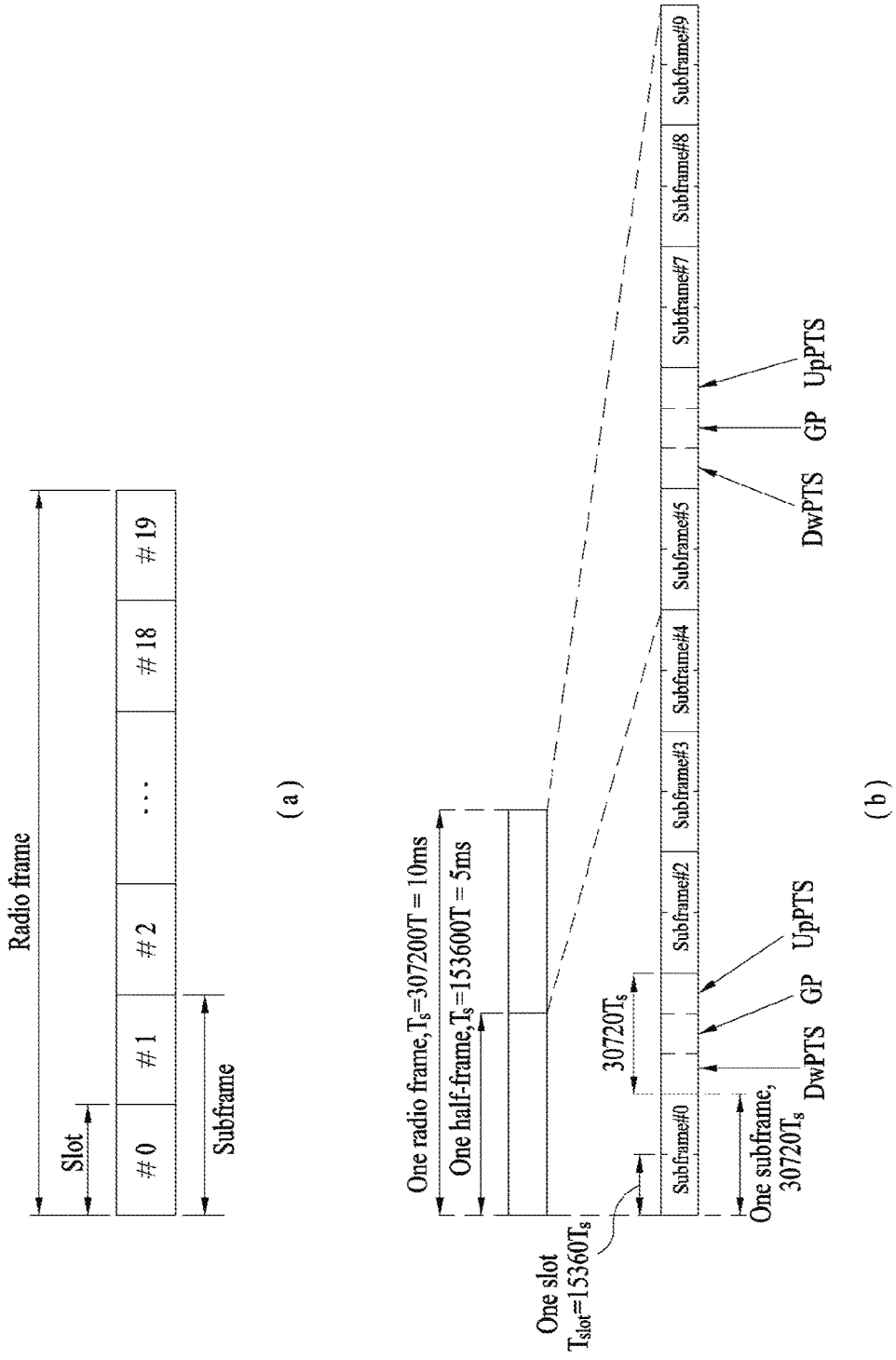
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)". In the following description, a base station can also be used as a meaning for such a device as a scheduling performing node, a cluster header or the like. If a base station or a relay transmits a signal transmitted by a terminal, the base station or the relay can be regarded as a terminal.

The term "cell", as used herein, may be applied to transmission and reception points such as a base station (eNB), sector, remote radio head (RRH) and relay, and may also be extensively used by a specific transmission/reception point to distinguish between component carriers.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
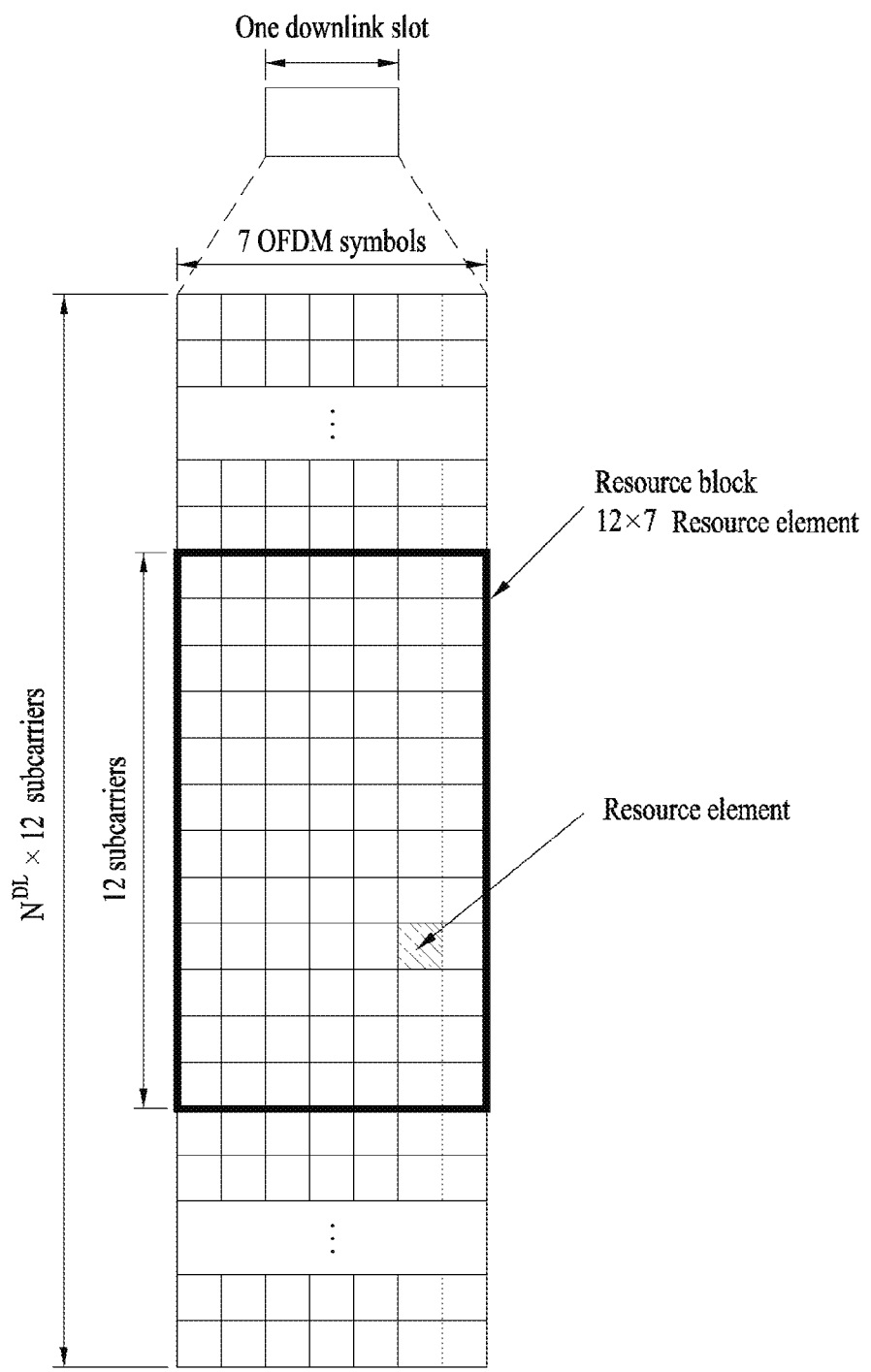
FIG. 2 illustrates a structure of a downlink resource grid for the duration of one downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
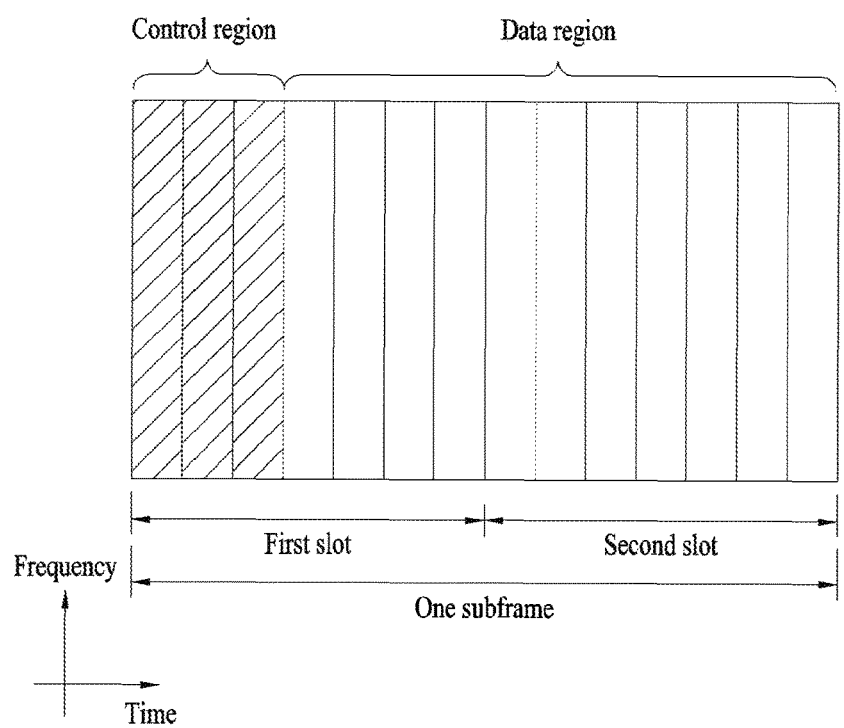
FIG. 3 illustrates a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
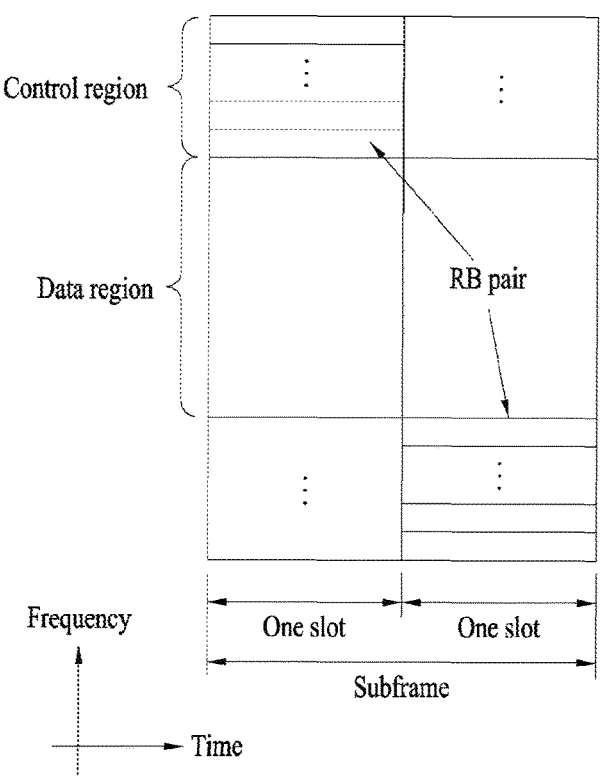
FIG. 4 illustrates a structure of an uplink subframe.

FIG. 4 illustrates a UL subframe structure. A UL subframe may be divided into a control region and a data region in the frequency domain A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 5:
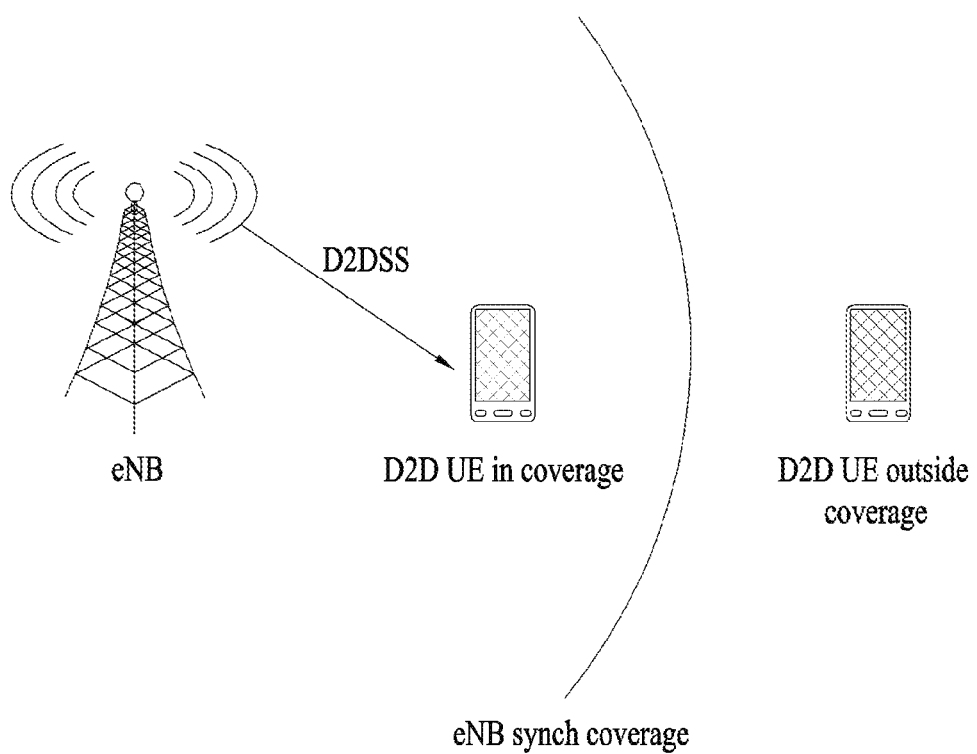
FIG. 5 illustrates relay of a synchronization signal.

In a situation illustrated in FIG. 5, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE. FIG. 5 illustrates an exemplary case in which a D2DSS is relayed and communication is conducted between D2D UEs based on the relayed D2DSS.

A Time Resource Pattern (TRP) for use in transmitting data, a discovery signal, etc. by a UE will be described according to various embodiments of the present invention. The term 'TRP' may be interchangeably used with 'Resource Pattern for Transmission (RPT)' or 'Time-RPT (T-RPT)'. However, the terms should not be construed as limiting the scope of the present invention. Thus, it is clarified that a resource pattern having TRP properties as described below corresponds to a TRP. In the following description, a scheme for indicating the position of transmission resources by an eNB/UE is referred to as mode 1/type 2 and a scheme for indicating the position of transmission resources in a specific resource pool by a transmitting UE (by the UE's selection) is referred to as mode 2/type 1. In the following description, Scheduling Assignment (SA) may mean control information related to D2D data transmission and a channel carrying the control information. Before data transmission, an SA may first be transmitted. A receiving D2D UE may determine the position of resources carrying the data by decoding the SA and then receive a D2D signal in the resources. In the following description, D2D may be referred to as sidelink. For the convenience of description, the term 'TRP indication bit sequence' may be used. The TRP indication bit sequence may include only an ID included in an SA. If the SA includes an additional bit field indicating a TRP, the TRP indication bit sequence may be interpreted as ID+TRP bit sequence. Or a bit sequence for indicating a TRP independent of the ID may be included in the SA. In this case, the TRP bit sequence may be interpreted as the TRP indication bit sequence. A set of bit sequences used to indicate a TRP, included and transmitted in the SA may be interpreted as the TRP indication bit sequence.

TRP

Figure 6:
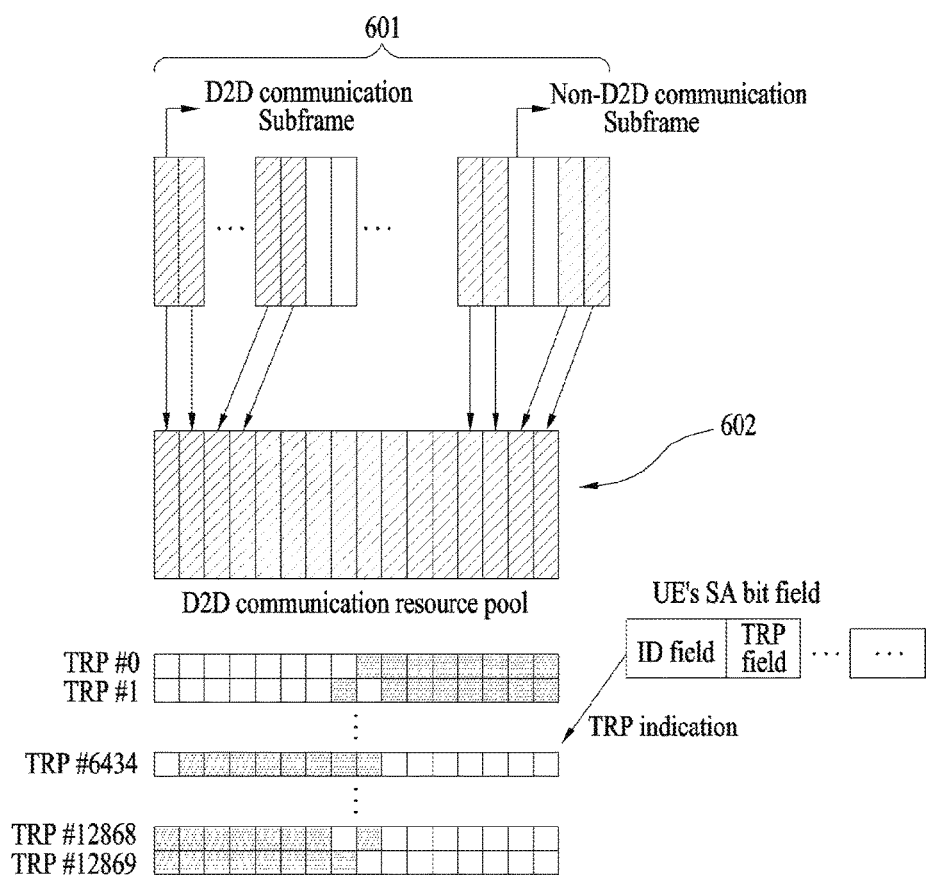
FIG. 6 illustrates a time resource pattern according to an embodiment of the present invention.

FIG. 6 illustrates TRPs according to an embodiment of the present invention. Referring to FIG. 6, a plurality of subframes 601 may include subframes available for D2D signal transmission and reception (e.g., UL subframes in TDD, and D2D communication subframes in FIG. 6) and subframes unavailable for D2D signal transmission and reception (non-D2D communication subframes in FIG. 6). The plurality of subframes 601 may be included within a D2D control information transmission period (e.g., a physical sidelink control channel). A subframe pool 602 for data transmission may be determined, which includes only D2D communication subframes from among the plurality of subframes 601.

As TRPs (TRP #0, #1, . . .) are applied to the subframe pool 602 for data transmission, a set of subframes to transmit D2D data may be determined. For example, if TRP #1 is applied to the subframe pool 602 for data transmission, an $8^{th}$ subframe and $10^{th}$ to $16^{th}$ subframes may be included in a subframe set, for D2D data transmission. Shaded parts of the TRPs in FIG. 16 may indicate subframes that will carry D2D data. A TRP may be a bitmap having bits corresponding to the respective subframes of a subframe pool for data transmission. If a bit of the bitmap is set to 1, the bit may indicate a subframe to transmit D2D data. Specifically, if a TRP is configured to be a bitmap, the shaded parts of the TRP may be 1s and the non-shaded parts of the TRP may be 0s in FIG. 6. For example, TRP #1 is a bitmap of {0, 0, 0, 0, 0, 0, 0, 1, 0, 1, 1, 1, 1, 1, 1, 1}.

Once a subframe set is determined for transmission of D2D data, the D2D data may be transmitted in the subframe set. Upon receipt of an SA, a UE may detect and decode a D2D signal in corresponding subframes, expecting transmission of the D2D signal in the subframes.

In the above description, a Transport Block (TB) for D2D data may be transmitted in a predetermined number of subframes in a subframe set. That is, the number of repetitions/a retransmission number/the number of retransmissions may be predetermined for each TB. For example, the number of retransmissions per TB may be fixed to 4.

The above-described plurality of subframes may be contiguous subframes following D2D control information-related subframes (including UL subframes that may carry D2D control information, DL subframes with no relation to the UL subframes, and special subframes in TDD) in one D2D control information period (i.e., one SA period). The D2D control information (an SA, an MCS, resource allocation information, a TRP, etc.) may be transmitted in subframes determined to transmit D2D control information (i.e., a subframe pool (for D2D control information)) from among subframes available for transmission of D2D control information according to an SA subframe bitmap. In this case, information indicating a TRP in a subframe next to the subframe pool for D2D control information may be transmitted in the D2D control information. If one SA period is configured as described above, subframes included in a subframe pool for data transmission are not overlapped with subframes included in a subframe pool for D2D control information. More specifically, if the subframe pool for D2D control information is overlapped with the subframe pool for D2D data transmission, it may be regulated that D2D control information or D2D data is always transmitted and the D2D control information and the D2D data are not transmitted in the same subframe.

Meanwhile, the subframe pool for data transmission may not be defined separately in D2D communication mode 1. In this case, UL subframes following the subframe pool for D2D control information transmission (specifically, a subframe pool including the first subframe of a subframe bitmap for D2D control information transmission to a subframe corresponding to the last 1 of the bitmap) may be a subframe pool for implicit mode 1 D2D data transmission.

Application of TRP

In the foregoing description, a TRP may be applied to subframes as follows.

A UE may determine a subframe indicator bitmap corresponding to TRP indication information. If the UE is a D2D control information transmitter, the TRP indication information may be transmitted in D2D control information. If the UE is a D2D control information receiver, the TRP indication information may be included in received D2D control information. Herein, the TRP indication information may be described in a later-described TRP indication part or may be an index indicating a specific subframe indicator bitmap. For example, if the size of the subframe indicator bitmap is 8, there may be a set of available bitmaps. An index may be assigned to each bitmap included in the bitmap set and a subframe indicator bitmap may be determined by such as index.

A bitmap to be applied to a subframe pool for data transmission may be determined from the subframe indicator bitmap. The subframe indicator bitmap may be smaller than the subframe pool for data transmission in size. In this case, the subframe indicator bitmap (e.g., a TRP indication bit sequence) may be repeated. If the length of the TRP indication bit sequence is M, the M-bit sequence is simply repeated and filled in the remaining L subframes. If L is not a multiple of M, a TRP may be generated by sequentially filling the remaining bit sequence in the L subframes.

That is, if the subframe indicator bitmap is smaller in size than the subframe pool for data transmission, the subframe indicator bitmap may be repeated within the bitmap for the subframe pool for data transmission.

For example, if the size M of the subframe indicator bitmap is smaller than the number of subframes in the resource pool for data transmission and the UE transmits D2D data in the first subframe of the subframe pool for data transmission, the UE may transmit D2D data in a $(1+M)^{th}$ subframe of the subframe pool. Or a first bit value of the bitmap (to be applied to the subframe pool for data transmission) may be equal to a (subframe indicator bitmap size+1)$^{th}$ bit value.

If the size of the subframe pool for data transmission is not a multiple of the size of the subframe indicator bitmap, the bits of the last repeated subframe indicator bitmap may be used sequentially. In other words, if the size of the subframe pool for data transmission is not a multiple of the size of the subframe indicator bitmap, the last repeated subframe indicator bitmap may be truncated. Specifically, if the subframe indicator bitmap is 16 bits {0, 0, 0, 0, 0, 0, 0, 1, 0, 1, 1, 1, 1, 1, 1, 1} and the subframe pool includes 36 subframes, the bitmap (to be applied to a subframe pool for data transmission) is configured by repeating the subframe indicator bitmap twice and using the first 4 bits of the subframe indicator bitmap sequentially at the third repetition (while truncating the remaining bits). That is, the bitmap (to be applied to the subframe pool for data transmission) is {0, 0, 0, 0, 0, 0, 0, 0, 1, 0, 1, 1, 1, 1, 1, 1, 1, 0, 0, 0, 0, 0, 0, 0, 1, 0, 1, 1, 1, 1, 1, 1, 1, 0, 0, 0, 0}.

Indication of TRP

Now, a description will be given of a method for indicating the above-described TRP.

First, an eNB may indicate an ID and TRP bits included and transmitted in an SA by a D2D SA grant in mode 1. The ID sequence included in the SA and/or the sequence of a TRP bit field included in the SA (a bit field indicating a specific ID and/or a TRP) may be explicitly included in the D2D SA grant. Or the ID sequence to be transmitted in the SA and/or the TRP bit field to be transmitted in the SA may be generated by hashing the bit sequence of a D2D-RNTI or using partial bits (e.g., lower N bits) of the bit sequence of the D2D-RNTI. Because an RNTI is different for each UE and at least a part of the RNTI is used, the position of D2D resources may be configured for each UE without additional signaling. A D2D-RNTI is an ID pre-signaled to distinguish D2D control information from other control information and is used for masking the CRC of the D2D control information. A part of the ID included and transmitted in the SA may be generated from the RNTI and the remaining part of the ID may be generated based on a target ID (or a group ID). Or the ID may be generated by combining (e.g., AND/XOR/OR-operating) both the RNTI and the target or group ID. The ID included and transmitted in the SA may be changed over time. Characteristically, only a Transmission (Tx) UE ID may be changed. This is because if up to a target UE ID part is hopped and a target UE is not aware of the hopping, the target UE may not detect the ID. If the target UE is aware of even a hopping pattern of the target UE ID part, every ID sequence included in the SA may be hopped in a predetermined rule. The changeability (hopping) of the ID sequence over time may be implemented by directly setting a different bit field in a D2D SA grant by the eNB and the ID sequence may be changed in a predetermined rule after the D2D SA grant of the eNB. For example, the ID sequence included in the D2D SA grant may be used as an initialization parameter for a random sequence and a time-variant sequence may be generated using a random sequence created using the initialization parameter.

Second, an ID may be transmitted in an SA and a TRP may be determined using the ID in mode 2. The ID may be a short ID induced from an ID (a transmission and/or reception (target or group) ID) by a higher layer or a bit sequence used to configure the transmission position of data and a scrambling parameter. If the ID included in the SA is too short for creation of TRP candidates, the probability of collision between IDs is increased. In this case, a plurality of Tx UEs are likely to use the same TRP. To prevent this, a part of the bits of the SA may include bits indicating a TRP. Also, a specific TRP may be indicated by combining an ID bit field and bits of a TRP field in the SA. For example, the ID included in the SA may be used to indicate a TRP set and TRP indication bits included in the SA may indicate a specific index within the TRP set. In another example, the TRP bits included in the SA may indicate a specific TRP set within a resource pool and the ID included in the SA may indicate a specific TRP within the pool/set indicated by the TRP bits. In this case, the bits indicating a TRP set may be transmitted semi-statically without being transmitted in every SA. For example, the bits indicating a TRP set may be used as a virtual CRC on the assumption that the bits are transmitted in every $n^{th}$ SA or even though the bits are transmitted in every SA, they are not changed over n SA transmissions. Meanwhile, these TRP bits are not included additionally. Rather, the TRP bits may be transmitted by borrowing an unused state of MCS bits or any other SA bit field. Or a TRP pattern may be indicated by using all unused states of additionally included bits and other bit fields.

Meanwhile, the size of TRP bits used in an indication of an SA may be changed according to the size of a D2D UE group or the number of Tx UEs in the group. For example, if a specific police officer group includes N police officers, the number of TRP indication bits is set to log2(N). Herein, the remaining unused bits may be used for other purposes or may be set to 0s for use as a virtual CRC.

Meanwhile, an ID may be set differently for a TRP in mode 1 and mode 2. For example, while a TRP may be indicated using only a Tx UE ID in mode 1, a TRP may be indicated using both a Tx UE ID and a target UE ID (group ID) in mode 2.

To configure a TRP, the following information may be used: i) information about the size of a transmission opportunity from the viewpoint of a UE (this information indicates how many resources are allocated to one UE by one SA); and ii) information about the number of retransmissions for each TB (this information may be information about the number of TB s transmitted during one SA period. In this case, the number of retransmissions for each TB may be calculated by flooring the size (number) of transmission opportunities during one SA period/the number of TBs transmitted by one SA. Or this information may be information about the (maximum) number of repetitions for each TB). Part of the information may be preset or configured by the network. The information may be preset for an out-of-coverage UE or signaled to the out-of-coverage UE from another UE within the network by a physical-layer signal or a higher-layer signal. In addition, part of the information may be included and transmitted in an SA. For example, the transmission opportunity size may be preset or configured by the network. Herein, a retransmission number for each TB may be included and transmitted in the SA. On the other hand, information about the transmission opportunity size may be included and transmitted in the SA and information about the retransmission number may be preset or semi-statically indicated in a higher-layer signal by the network.

In a specific example, if an SA includes an 8-bit ID, the number of TRPs distinguishable by IDs is 256 (=$2^8$). If a mode-2 resource pool includes 16 subframes and a transmission opportunity size is 8, the number of TRPs that can be generated is 12870 (=16C8). Therefore, it is impossible to identify a TRP only by the ID bits included in the SA. To avoid this problem, additional bits may be included in the SA in order to indicate a TRP in the above-described method. In this case, about 6 additional bits are needed to distinguish all TRPs that can be produced. The additional bits may be available from a combination of unused MCS states and a new bit field or from an additional bit field.

Configurations of Apparatuses According to Embodiment of the Present Invention

Figure 7:
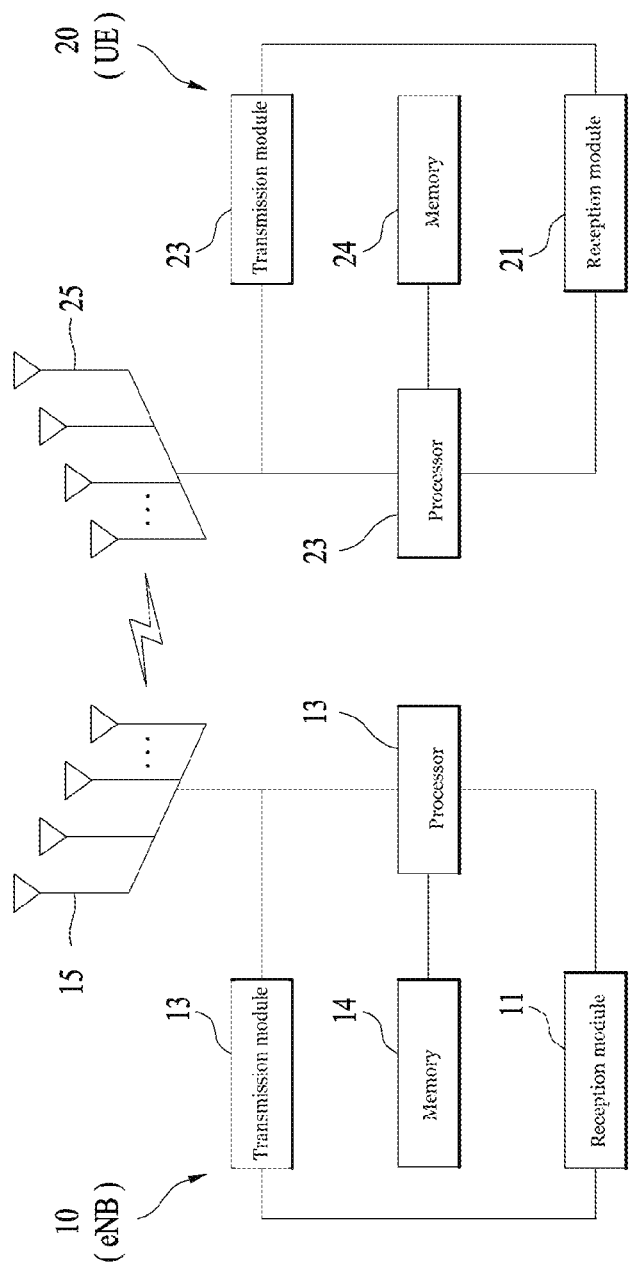
FIG. 7 is a block diagram of a transmission apparatus and a reception apparatus.

FIG. 7 is a block diagram of a transmission point and a UE according to an embodiment of the present invention.

Referring to FIG. 7, a transmission point 10 according to the present invention may include a Reception (Rx) module 11, a Tx module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 7 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 7 is applicable to a relay as a DL transmitter or a UL receiver, and the description of the UE 20 in FIG. 7 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

What is claimed is:

1. A method for a user equipment to transmit D2D (device to device) data in a wireless communication system, the method comprising:
   determining a first subframe bitmap corresponding to information indicating a TRP (time resource pattern);
   determining a second subframe bitmap to be applied to a subframe pool for the D2D data transmission by using the first subframe bitmap,
   wherein, if a size M of the first subframe bitmap is smaller than a size of the subframe pool for the D2D data transmission, the first subframe bitmap is repeated, and
   wherein, if the size M of the subframe pool for the D2D data transmission is not an integer multiple of the size of the first subframe bitmap, one or more bits of the lastly repeated first subframe bitmap are sequentially used; and
   transmitting the D2D data in a subframe included in a set of the subframes corresponding to the second subframe bitmap.

2. The method of claim 1, wherein if the size M of the first subframe bitmap is smaller than the size of the subframe pool for the D2D data transmission and the user equipment transmits the D2D data in a first subframe of the subframe pool for the D2D data transmission, the user equipment also transmits the D2D data in a (1+M)th subframe of the subframe pool for the D2D data transmission.

3. The method of claim 1, wherein a first bit value of the second subframe bitmap is identical to (the size M of the subframe bitmap+1)$^{th}$ bit value of the second subframe bitmap.

4. A user equipment transmitting a D2D (device to device) data in a wireless communication system, the user equipment comprising:
   a reception module; and
   a processor, the processor configured to determine a first subframe bitmap corresponding to information indicating a TRP (time resource pattern), the processor configured to determine a second subframe bitmap to be applied to a subframe pool for the D2D data transmission by using the first subframe bitmap, the processor configured to transmit the D2D data in a subframe included in a set of the subframes corresponding to the second subframe bitmap,
   wherein if a size M of the first subframe bitmap is smaller than a size of the subframe pool for the D2D data transmission, the first subframe bitmap is repeated, and
   wherein if the size M of the subframe pool for the D2D data transmission is not an integer multiple of the size of the first subframe bitmap, one or more bits of the lastly repeated first subframe bitmap are sequentially used.

5. The user equipment of claim 4, wherein if the size M of the first subframe bitmap is smaller than the size of the subframe pool for the D2D data transmission and the user equipment also transmits the D2D data in a first subframe of the subframe pool for the D2D data transmission, the user equipment transmits the D2D data in a (1+M)th subframe of the subframe pool for the D2D data transmission.

6. The user equipment of claim 4, wherein a first bit value of the second subframe bitmap is identical to (the size M of the first subframe bitmap+1)$^{th}$ bit value of the second subframe bitmap.

* * * * *